(12) United States Patent
Kim et al.

(10) Patent No.: US 8,451,112 B2
(45) Date of Patent: May 28, 2013

(54) METHODS AND APPARATUS FOR ESTIMATING DEPARTURE TIME BASED ON KNOWN CALENDAR EVENTS

(75) Inventors: Frederick D. Kim, Carlsbad, CA (US); Robert S. Daley, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 891 days.

(21) Appl. No.: 12/581,301

(22) Filed: Oct. 19, 2009

(65) Prior Publication Data

US 2011/0090078 A1    Apr. 21, 2011

(51) Int. Cl.
*G08B 19/00*    (2006.01)
(52) U.S. Cl.
USPC ............................ 340/522; 340/905; 340/994
(58) Field of Classification Search
USPC ............. 340/905, 994, 522, 309.15; 701/204, 701/207, 213
See application file for complete search history.

(56) References Cited

U.S. PATENT DOCUMENTS

| 5,790,974 | A | * | 8/1998 | Tognazzini | 455/456.5 |
| 2005/0131631 | A1 | * | 6/2005 | Nakano et al. | 701/200 |
| 2007/0271031 | A1 | * | 11/2007 | Jung et al. | 701/204 |
| 2008/0046298 | A1 | * | 2/2008 | Ben-Yehuda et al. | 705/6 |
| 2009/0105940 | A1 | * | 4/2009 | Bitan | 701/201 |
| 2009/0118996 | A1 | * | 5/2009 | Kantarjiev et al. | 701/119 |

* cited by examiner

*Primary Examiner* — Daryl Pope
(74) *Attorney, Agent, or Firm* — Darren M. Simon

(57) ABSTRACT

A method and apparatus generating a departure alert for an event based on a current location. The method may comprises: obtaining scheduling data associated with a first event, wherein the first event scheduling data includes a first event time value and a first event location value, obtaining a device location value, obtaining a current time value, determining if the first event location value and the device location value differ by more than a event location threshold, upon a determination that the first event location value and the device location value differ by more than the event location threshold, estimating a first travel time value from the device location and the first event location, generating a departure time value by comparing the first event time value and the estimated first travel time value, and generating a departure alert by comparing the departure time value and the current time value.

62 Claims, 7 Drawing Sheets

METHODS AND APPARATUS FOR ESTIMATING DEPARTURE TIME BASED ON KNOWN CALENDAR EVENTS

BACKGROUND

1. Field

The disclosed aspects relate to departure time estimations based on known criteria.

2. Background

Wireless communications device (WCD) are used as organizational aid in a variety of context. For example, a WCD may include functionality which allows a user access to a calendar and/or contacts. Further, such information can be synchronized with a user's other computing device to allow a user to maintain uniform information across computing platforms.

Currently, such calendar information may become less useful in unfamiliar settings, such as during travel to unfamiliar locations, or during disruptive events. For example, when traveling, a user does not know when to leave their current location in order to arrive at a destination on time due to unfamiliarity with local conditions (ex., traffic, directions, etc.). Thus, improved apparatus and methods for generating departure alerts for scheduled events based on a user's current location are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with generating at least one departure alert for at least one event. According to one aspect, a method for generating at least one departure alert for at least one event is provided. The method may include obtaining scheduling data associated with a first event, wherein the first event scheduling data includes a first event time value and a first event location value. Further, the method may include obtaining a device location value. Still further, the method may include obtaining a current time value. Even further, the method may include determining if the first event location value and the device location value differ by more than a event location threshold. Even further, the method may include that upon a determination that the first event location value and the device location value differ by more than the event location threshold, estimating a first travel time value from the device location and the first event location. Additionally, the method may include generating a departure time value by comparing the first event time value and the estimated first travel time value. Moreover, the method may include generating a departure alert by comparing the departure time value and the current time value.

Yet another aspect relates to at least one processor configured to generate at least one departure alert for at least one event. The processor may include a first module for obtaining scheduling data associated with a first event, wherein the first event scheduling data includes a first event time value and a first event location value. Further the processor may include a second module for obtaining a device location value. Still further the processor may include a third module for obtaining a current time value. Even further the processor may include a fourth module for determining if the first event location value and the device location value differ by more than a event location threshold. Yet further the processor may include a fifth module for estimating a first travel time value from the device location and the first event location upon a determination that the first event location value and the device location value differ by more than the event location threshold. Additionally, the processor may include a sixth module for generating a departure time value by comparing the first event time value and the estimated first travel time value. Moreover, the processor may include a seventh module for generating a departure alert by comparing the departure time value and the current time value.

Still another aspect relates to a computer program product comprising a computer-readable medium. The computer program product may include a computer-readable medium including a first set of codes for causing a computer to obtain scheduling data associated with a first event, wherein the first event scheduling data includes a first event time value and a first event location value. The computer program product may further include a computer-readable medium including a second set of codes for causing the computer to obtain a device location value. The computer program product may still further include a computer-readable medium including a third set of codes for causing the computer to obtain a current time value. The computer program product may further include a computer-readable medium including a fourth set of codes for causing the computer to determine if the first event location value and the device location value differ by more than a event location threshold. The computer program product may still further include a computer-readable medium including a fifth set of codes for causing the computer to estimate a first travel time value from the device location and the first event location upon a determination that the first event location value and the device location value differ by more than the event location threshold. The computer program product may still further include a computer-readable medium including a sixth set of codes for causing the computer to generate a departure time value by comparing the first event time value and the estimated first travel time value. Additionally, the computer program product may include a computer-readable medium including a seventh set of codes for causing the computer to generate a departure alert by comparing the departure time value and the current time value.

Yet another aspect relates to an apparatus. The apparatus may include means for obtaining scheduling data associated with a first event, wherein the first event scheduling data includes a first event time value and a first event location value. Further the apparatus may include means for obtaining a device location value. Still further the apparatus may include means for obtaining a current time value. Even further the apparatus may include means for determining if the first event location value and the device location value differ by more than a event location threshold. Yet further the apparatus may include means for estimating a first travel time value from the device location and the first event location upon a determination that the first event location value and the device location value differ by more than the event location threshold. Additionally, the apparatus may include means for generating a departure time value by comparing the first event time value and the estimated first travel time value. Moreover, the apparatus may include means for generating a departure alert by comparing the departure time value and the current time value.

Another aspect relates to an apparatus. The apparatus may include a communications module for: obtaining scheduling data associated with a first event, wherein the first event scheduling data includes a first event time value and a first event location value, obtaining a device location value, and obtaining a current time value. Further, the apparatus may include a departure alert module for: determining if the first event location value and the device location value differ by more than an event location threshold, upon a determination that the first event location value and the device location value differ by more than the event location threshold, estimating a first travel time value from the device location and the first event location, generating a departure time value by comparing the first event time value and the estimated first travel time value, and generating a departure alert by comparing the departure time value and the current time value.

Furthermore, in accordance with one or more aspects and corresponding disclosure thereof, various aspects are described in connection with generating at least one departure alert for a device for at least one event. According to one aspect, a method for generating at least one departure alert for a device for at least one event is provided. The method may include obtaining scheduling data associated with a first event, wherein the first event scheduling data includes a first event time value and a first event location value. Further, the method may include obtaining a device location value. Still further, the method may include obtaining a current time value. Even further, the method may include determining if the first event location value and the device location value differ by more than a event location threshold. Even further, the method may include that upon a determination that the first event location value and the device location value differ by more than the event location threshold, estimating a first travel time value from the device location and the first event location. Additionally, the method may include generating a departure time value by comparing the first event time value and the estimated first travel time value. Moreover, the method may include generating a departure alert by comparing the departure time value and the current time value. Yet further still, the method may include transmitting the departure alert to the device.

Yet another aspect relates to at least one processor configured to generate at least one departure alert for at least one event. The processor may include a first module for obtaining scheduling data associated with a first event, wherein the first event scheduling data includes a first event time value and a first event location value. Further the processor may include a second module for obtaining a device location value. Still further the processor may include a third module for obtaining a current time value. Even further the processor may include a fourth module for determining if the first event location value and the device location value differ by more than a event location threshold. Yet further the processor may include a fifth module for estimating a first travel time value from the device location and the first event location upon a determination that the first event location value and the device location value differ by more than the event location threshold. Additionally, the processor may include a sixth module for generating a departure time value by comparing the first event time value and the estimated first travel time value. Moreover, the processor may include a seventh module for generating a departure alert by comparing the departure time value and the current time value. Still further, the processor may include a eighth module for transmitting the departure alert to the device.

Still another aspect relates to a computer program product comprising a computer-readable medium. The computer program product may include a computer-readable medium including a first set of codes for causing a computer to obtain scheduling data associated with a first event, wherein the first event scheduling data includes a first event time value and a first event location value. The computer program product may further include a computer-readable medium including a second set of codes for causing the computer to obtain a device location value. The computer program product may still further include a computer-readable medium including a third set of codes for causing the computer to obtain a current time value. The computer program product may further include a computer-readable medium including a fourth set of codes for causing the computer to determine if the first event location value and the device location value differ by more than a event location threshold. The computer program product may still further include a computer-readable medium including a fifth set of codes for causing the computer to estimate a first travel time value from the device location and the first event location upon a determination that the first event location value and the device location value differ by more than the event location threshold. The computer program product may still further include a computer-readable medium including a sixth set of codes for causing the computer to generate a departure time value by comparing the first event time value and the estimated first travel time value. Additionally, the computer program product may include a computer-readable medium including a seventh set of codes for causing the computer to generate a departure alert by comparing the departure time value and the current time value. Still further, the computer program product may include a computer-readable medium including a eighth set of codes for causing the computer to transmit the departure alert to the device.

Yet another aspect relates to an apparatus. The apparatus may include means for obtaining scheduling data associated with a first event, wherein the first event scheduling data includes a first event time value and a first event location value. Further the apparatus may include means for obtaining a device location value. Still further the apparatus may include means for obtaining a current time value. Even further the apparatus may include means for determining if the first event location value and the device location value differ by more than a event location threshold. Yet further the apparatus may include means for estimating a first travel time value from the device location and the first event location upon a determination that the first event location value and the device location value differ by more than the event location threshold. Additionally, the apparatus may include means for generating a departure time value by comparing the first event time value and the estimated first travel time value. Moreover, the apparatus may include means for generating a departure alert by comparing the departure time value and the current time value. Further, the apparatus may include means for transmitting the departure alert to the device.

Another aspect relates to an apparatus. The apparatus may include a communications module for: obtaining scheduling data associated with a first event, wherein the first event scheduling data includes a first event time value and a first event location value, obtaining a device location value, and obtaining a current time value. Further, the apparatus may include a departure alert module for: determining if the first event location value and the device location value differ by more than an event location threshold, upon a determination that the first event location value and the device location value differ by more than the event location threshold, estimating a first travel time value from the device location and the first event location, generating a departure time value by comparing the first event time value and the estimated first travel time value, and generating a departure alert by comparing the departure time value and the current time value. Further, the communication module is operable for transmitting the departure alert to the device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The ability to accurately determine a departure time from known calendar events may be accomplished by using information associated with the known calendar events, such as event location, participants, etc., and information associated with a current device location, such as, traffic, user defined departure buffers, etc. In particular, the presented aspects of the device allow a wireless device to alert a user of departure times, possible event conflicts, etc., in a location which may be unfamiliar to the user.

Figure 1:
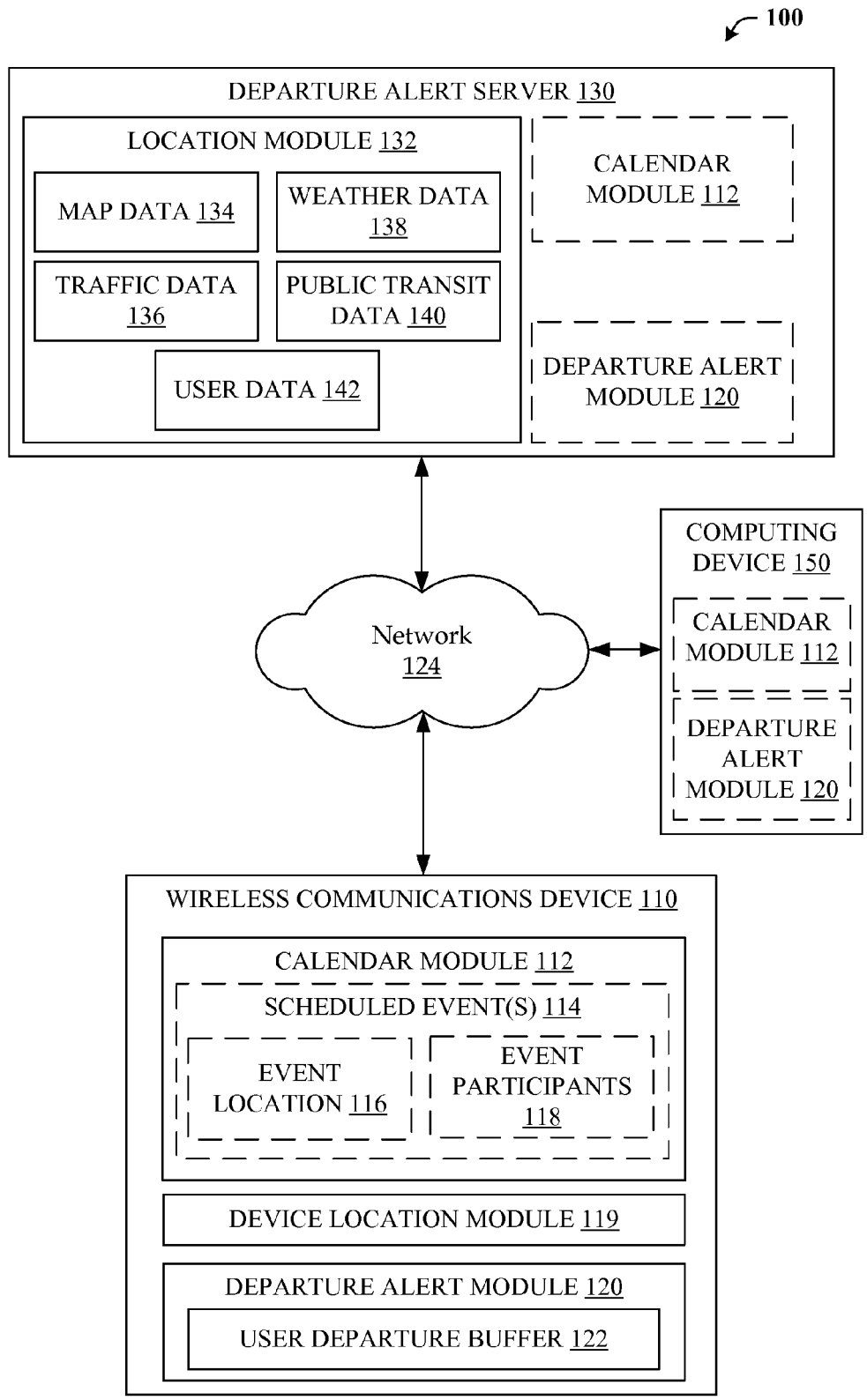
FIG. 1 illustrates a block diagram of a communication network according to an aspect.

With reference to FIG. 1, a block diagram of a communication network 100 according to an aspect is illustrated. Communication network 100 may include wireless communications devices 110 communicatively coupled to a network 124, e.g., a CDMA network, a GPRS network, a UMTS network, IP network, and other types or combinations of types of communication networks. Communication network 100 may further include a departure alert server 130 communicatively coupled to network 124. In one aspect, communication network 100 may further include a computing device 150 communicatively coupled to network 124.

In one aspect, wireless communications device (WCD) 110 may include calendar module 112, device location module 119 and departure module 120. In such an aspect, calendar module 112 may include one or more scheduled events 114, each of which may include at least one of an event location 116 and/or event participants 118. For example, a user may schedule a meeting at a specific building in a specific room including at least one of participant. In one aspect, departure alert module 120 may include user departure buffer 122. In such an aspect, user departure buffer 122 may allow user to include additional time between events and may be: configurable by a user, may be set to a default value, etc. Further, device location module 119 may obtain the current location of the device. In one aspect, device location module 119 may include location determining functionality, such as GPS, WiFi, Bluetooth, etc., or any combination thereof, may access a user inputted location, may access a location determined by the departure alert server 130, etc.

In one aspect, departure alert server 130 may include location module 132. Location module may include information modules such as, but not limited to, map data 134, traffic data 136, weather data 138, public transit data 140, user data 142, etc. In one aspect, such information may be stored by departure alert server 130, and may be updated periodically. In other aspect, such information may be obtained from one or more other servers upon request. Additionally, in one aspect, departure alert server 130 may include calendar module 112 and/or departure alert module 120, such as described above. Further, in one aspect, computing device 150 may include calendar module 112 and/or departure alert module 120, such as described above.

In operation, a user may populate calendar module 112 with at least one event at a specified location, and possibly with specific participants. In one aspect, such populating may occur through the calendar module on the WCD 110, the computing device 150, or a device with access to departure alert server 130. In an aspect in which the information is not provided directly to WCD 110, then the information may be synchronized among the various components of communication network 100. Once WCD 110 has at least one scheduled event stored in the device, departure alert module 120 may be activated to determine an applicable departure time for the stored event. In one aspect, a user may select to activate departure alert module 120. In another aspect, departure alert module may be activated automatically upon receipt of a scheduled event 114. Departure alert module 119 may obtain the current device location from device location module 119 and applicable information from departure alert server 130, such as but not limited to, map data 134, traffic data 136, weather data 138, public transit data 140, user data 142, etc. Using the obtained information, departure alert module 120 may determine a departure time for a scheduled event 114. In one aspect, departure alert module may add a user defined buffer 122 to the determined departure time. For example, if a user is walking between locations, and has an excessive amount of luggage, the user may input a larger buffer time to allow for slowing walking In one aspect, the determined departure time may be stored with and/or associated with the scheduled event 114. In such an aspect, a departure alert may be activated when a determined departure time occurs.

Accordingly, wireless communications device 110 may alert a user of a departure time through processing a known schedule event and other information obtained from a departure alert server 130.

Figure 2:
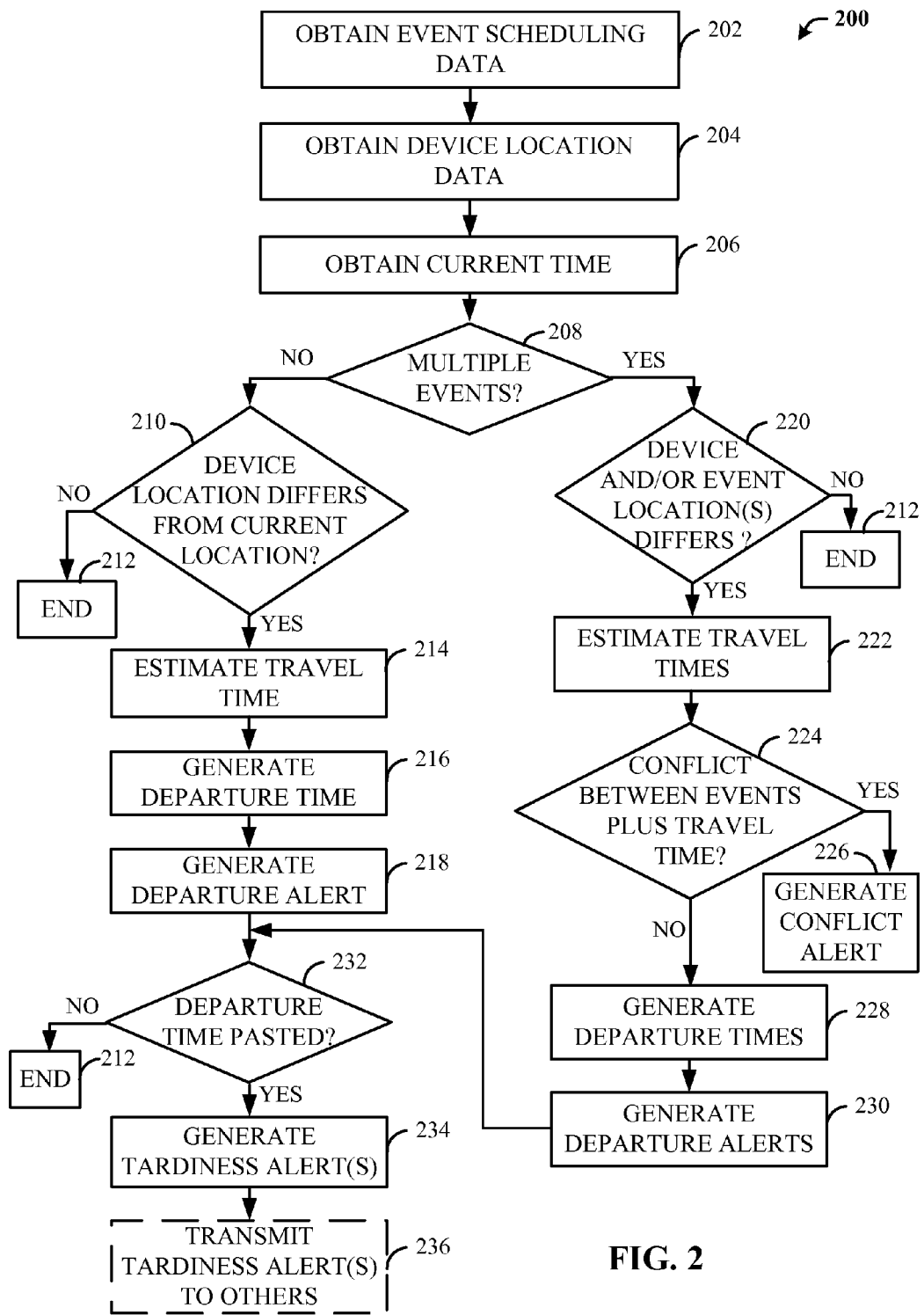
FIG. 2 is a flowchart of an aspect of an overview of a communication network departure alert process.

FIG. 2 illustrates various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring to FIG. 2, at reference numeral 202, one or more scheduled events may be obtained by the WCD. In one aspect, the scheduled events may be obtaining from inputting the event directly into the WCD. In another aspect, the scheduled event information may include any combination of the following: event start and stop times, an event location, event participants, etc. In still another aspect, the scheduled events may be received from a remote source, such a second computing device and/or server. For example, a user may synchronize a populated calendar maintained on a work computer with his or her WCD.

At reference numeral 204, the location of the device is obtained. In one aspect, the device location may be obtained by receiving at least one of: a user input, a location detecting sensor associated with the device, a network provided value, etc. At reference numeral 206, the current time may be obtained. In one aspect, the current time may be obtained by receiving at least one of: a user input, a network provided value, etc.

At reference numeral 208 it is determined whether multiple scheduled events have been obtained. If at reference numeral 208, only one event has been added and/or only one scheduled event has been selected for a departure alert process, then at reference numeral 210, it is determined where the device location differs from the location of the event. If at reference numeral 210, it is determined that the device and event are within a threshold distance of each other, then at reference numeral 212, the process stops. In one aspect, a distance threshold may include at least one of: a user selected value, a default device value, a network provided value, etc. In another aspect, a departure alert process may be triggered by a triggering event, wherein the trigger event may include at least one of: a determination that device is located in a foreign locality, a determination that the device operated in airplane mode within a predefined duration of time, a user selection, etc.

By contrast, if at reference numeral 210 it is determined that the device and event are not within a threshold distance of each other, then at reference numeral 214, travel time between the locations may be estimated. In one aspect, such travel time estimating may be performed by at least one of: the WCD, an associated server, etc. Further, determining the travel time may include determining at least one route between the device location and the event location, and determining the influence at least one of: traffic conditions, a mode of transportation selection, a user selection of one route, etc., on travel. In one aspect, the mode of transportation information may include determining whether movement of the device may be associated with at least one of: walking, moving in a personal transportation vehicle, moving in a public transportation vehicle, etc.

At reference numeral 216, a departure time may be generated. In one aspect, the departure time generation may be performed by at least one of: the WCD, an associated server, etc. At reference numeral 218, a departure alert may be generated from the departure time, the current time and other factors. In one aspect, a user buffer time may be added to a departure time. For example, if a user is walking between locations, and has an excessive amount of luggage, the user may input a larger buffer time to allow for slowing walking Returning to reference numeral 208, if it is determined that multiple scheduled events have been obtained, then at reference numeral 220, it is determined whether any of the event locations and/or the events and the device location differ beyond a threshold. If at reference numeral 220, it is determined that the device and events and/or each event are within a threshold distance of each other, then at reference numeral 212, the process stops. In one aspect, a distance threshold may include at least one of: a user selected value, a default device value, a network provided value, etc. In another aspect, a departure alert process may be triggered by a triggering event, wherein the trigger event may include at least one of: a determination that device is located in a foreign locality, a determination that the device operated in airplane mode within a predefined duration of time, a user selection, etc.

By contrast, if at reference numeral 220 it is determined that the device and event are not within a threshold distance of each other, then at reference numeral 222, travel times between the locations may be estimated. As such, travel times between events and/or travel times between the device location and events may be estimated. In one aspect, such travel time estimating may be performed by at least one of: the WCD, an associated server, etc. Further, determining the travel time may include determining at least one route between the applicable locations, and determining the influence at least one of: traffic conditions, a mode of transportation selection, a user selection of one route, etc., on travel between the applicable locations. In one aspect, the mode of transportation information may include determining whether movement of the device may be associated with at least one of: walking, moving in a personal transportation vehicle, moving in a public transportation vehicle, etc.

At reference numeral 224, it is determined whether a conflict exists between scheduled events after estimated travel times have been applied. If at reference numeral 224, it is determined that a conflict exists, then at reference numeral 226, a conflict alert may be generated. In one aspect, generating a conflict alert may be performed by at least one of: the WCD, an associated server, etc. Further, upon generation of a conflict alert, a user may be prompted to perform additional tasks, such as but not limited to, rescheduling one of the conflicting events, notifying other event participants of the conflict, etc.

By contrast, if at reference numeral 224, it is determined that no conflicts exist, then at reference numeral 228, departure times may be generated. In one aspect, the departure time generation may be performed by at least one of: the WCD, an associated server, etc. At reference numeral 230, a departure alert may be generated from processing one of the generated departure times, the current time and other factors. In one aspect, a user buffer time may be added to a departure time before processing. For example, if a user is walking between locations, and has an excessive amount of luggage, the user may input a larger buffer time to allow for slowing walking At reference numeral 232, it is determined whether a departure alert has temporally exceeded the current time. If at reference numeral 232, it is determined the departure alert time has not temporally exceeded the current time, and/or has not encroached within a predetermined threshold of the current time, then the process may end at reference numeral 212. Further, in one aspect, at least one of the WCD, a server, etc., may periodically check to see if the departure alert has temporally exceeded the current time.

By contrast, if at reference numeral 232, it is determine that the departure alert has temporally exceeded the current time, then at reference numeral a tardiness alert may be generated. In one aspect, at reference numeral 236, a user may be prompted to perform additional tasks in response to the generated tardiness alert, such as but not limited to, rescheduling one of the events triggering the tardiness alert, notifying other event participants of the user's possible tardiness, suggesting alternative modes of transit, suggesting alternative routes, etc. For example, a user may be running late to catch a flight. In such a case, the tardiness alert may be transmitted to the airline to inform them that the user will either need to reschedule or will arrive shortly and to please hold the flight.

Figure 3:
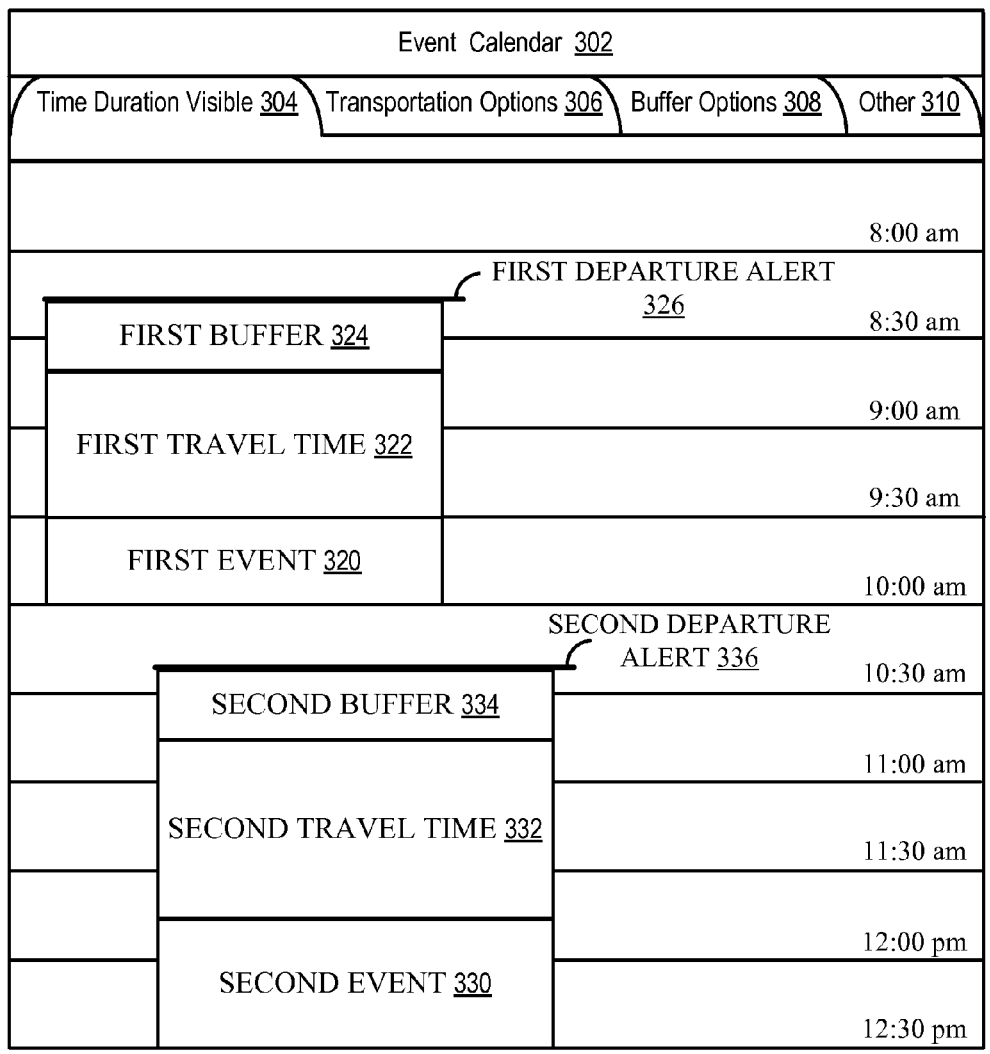
FIG. 3 illustrates an exemplary screen shot an aspect depicted in FIG. 1.

With reference to FIG. 3, an exemplary screen shot 300 depicting application of an aspect of a departure alert process in the context of a user calendar 302 is shown. In the depicted screen shot, a user may have multiple events scheduled (320, 330). Further, in the depicted aspect, event calendar may provide multiple options to the user, such as: the time duration visible 304 on the event calendar, e.g. a day, a week, a month, etc.; transportation options 306 available to a user to get between locations, e.g. car, bus, train, etc.; user defined buffer options 308, to allow a user to add a time buffer (e.g. 324, 334) to an estimated travel time (e.g. 322, 332); and other 310 options to further facilitate determining an appropriate departure time. Such other options 310 may include traffic information inputs, weather inputs, public transit information, etc.

In the depicted screen shot, two events have been scheduled (320, 330). Further, a departure alert process, such as described with reference to FIG. 2, has been applied. The results of the departure alert process may be seen as the additions of travel times (322, 332), buffer times (324, 334), and departure alerts (326, 336).

For example, in one aspect, a user may access his or her calendar at the beginning of the day. Upon review, the user notes that there is an appointment 320 to meet a client in Manhattan at 9:30 am and a second appointment 330 to meet another client in Brooklyn at 11:45 am. In such an example, a travel time 332 between the appointments is provided. Further, while at the first appointment 320, traffic issues arise on a possible route between the appointments. As such, calendar 302 adjusts the travel time 332 and may notify the user of the additional time needed for the commute and/or may notify the clients of the second appointment that the user may be late.

Figure 4:
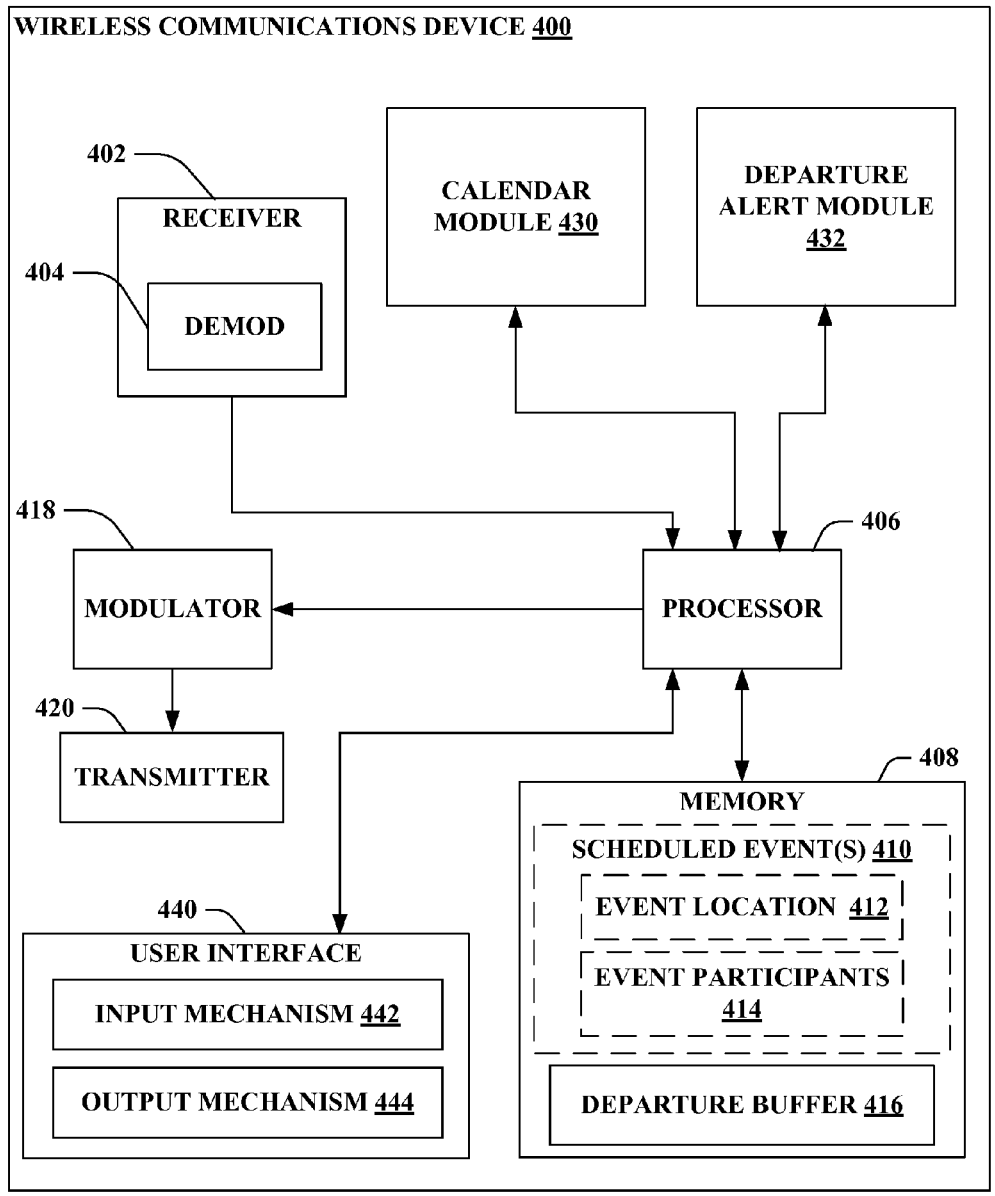
FIG. 4 illustrates a block diagram example architecture of a wireless communications device.

While still referencing FIG. 1, but turning also now to FIG. 4, an example architecture of wireless communications device 110 is illustrated. As depicted in FIG. 4, wireless communications device 400 comprises receiver 402 that receives a signal from, for instance, a receive antenna (not shown), performs typical actions on (e.g., filters, amplifies, downconverts, etc.) the received signal, and digitizes the conditioned signal to obtain samples. Receiver 402 can comprise a demodulator 404 that can demodulate received symbols and provide them to processor 406 for channel estimation. Processor 406 can be a processor dedicated to analyzing information received by receiver 402 and/or generating information for transmission by transmitter 420, a processor that controls one or more components of wireless communications device 400, and/or a processor that both analyzes information received by receiver 402, generates information for transmission by transmitter 420, and controls one or more components of wireless communications device 400.

Wireless communications device 400 can additionally comprise memory 408 that is operatively coupled to processor 406 and that can store data to be transmitted, received data, information related to available channels, data associated with analyzed signal and/or interference strength, information related to an assigned channel, power, rate, or the like, and any other suitable information for estimating a channel and communicating via the channel. Memory 408 can additionally store protocols and/or algorithms associated with estimating and/or utilizing a channel (e.g., performance based, capacity based, etc.). In one aspect, memory 408 can include a calendar with one or more scheduled events 410, wherein a schedule event may include event location information 412, information associated with event participants 414, event start time, event duration, etc. In one aspect, memory 408 a departure buffer 416, which may be selected by a user, set to a default value, defined by a server, etc., to provide additional time beyond the estimated time to travel to and/or between events.

It will be appreciated that data store (e.g., memory 408) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 408 of the subject systems and methods may comprise, without being limited to, these and any other suitable types of memory.

Wireless communications device 400 can further include calendar module 430 to facilitate obtaining and/or maintaining a current calendar of scheduled events on the WCD 400. For example, calendar module 430, may obtain the schedule events 410 from a user input directly into the WCD 400. In another aspect, calendar module 430, may obtain the schedule events from a remote source, such a second computing device and/or server. For example, a user may synchronize a populated calendar maintained on a work computer with his or her WCD. Further calendar module 430 may facilitate storage and/or updating of stored scheduled events 410.

Wireless communications device 400 can further include departure alert module 432 to enable WCD 400 to generate departure alerts associated with stored scheduled events 410. Departure alert module may process scheduled event information, along with information received from a server, user, etc., to generate departure alerts, wherein a departure alert notifies a user when to leave a current location to arrive on time at a subsequent location. In one aspect, additional information used by departure alert module may include: map data, traffic data, weather data, public transit data, user data, etc. In one aspect, departure alert module 432 may add a user defined buffer 416 to the determined departure time. For example, if a user is walking between locations, and has an excessive amount of luggage, the user may input a larger buffer time to allow for slowing walking In one aspect, the determined departure time may be stored with and/or associated with the applicable scheduled event 410. In such an aspect, a departure alert may be activated when a determined departure time occurs.

Additionally, wireless communications device 400 may include user interface 440. User interface 440 may include input mechanisms 442 for generating inputs into communications device 400, and output mechanism 442 for generating information for consumption by the user of the communications device 400. For example, input mechanism 442 may include a mechanism such as a key or keyboard, a mouse, a touch-screen display, a microphone, etc. Further, for example, output mechanism 444 may include a display, an audio speaker, a haptic feedback mechanism, a Personal Area Network (PAN) transceiver etc. In the illustrated aspects, the output mechanism 444 may include a display operable to present media content that is in image or video format or an audio speaker to present media content that is in an audio format.

In operation, wireless communication device 400 may obtain through calendar module 430 scheduling data associated with at least one event 410, wherein the data may include applicable event start times, possible participants 414 and locations 412. Further, WCD 400 may obtain at least a location value for the device and a current time. In one aspect, from the obtained information, departure alert module 432 may determine if scheduled events 410 are to be held at different locations from each other and/or from the device location. In such an aspect, after departure alert module 432 determines applicable event and/or device locations sufficiently differ, departure alert module 432 estimates travel time between the events and/or between the event and device. Continuing the above aspect, departure alert module 432 may generate a departure time value by comparing an event time value and an applicable estimated travel time value. Further, departure alert module 432 may generate a departure alert by comparing the departure time value and the current time value. In one aspect, the above described operations may be performed by a server, such as departure alert server 130, and resulting departure alert values may be transmitted to WCD 400. Further, in another aspect, the above described operations may be performed by a remote computing device, such as computing device 150, and resulting departure alert values may be transmitted to WCD 400.

Accordingly, wireless communications device 400 may generate at least one departure alert for at least one event based at least in part on the location of WCD 400.

Figure 5:
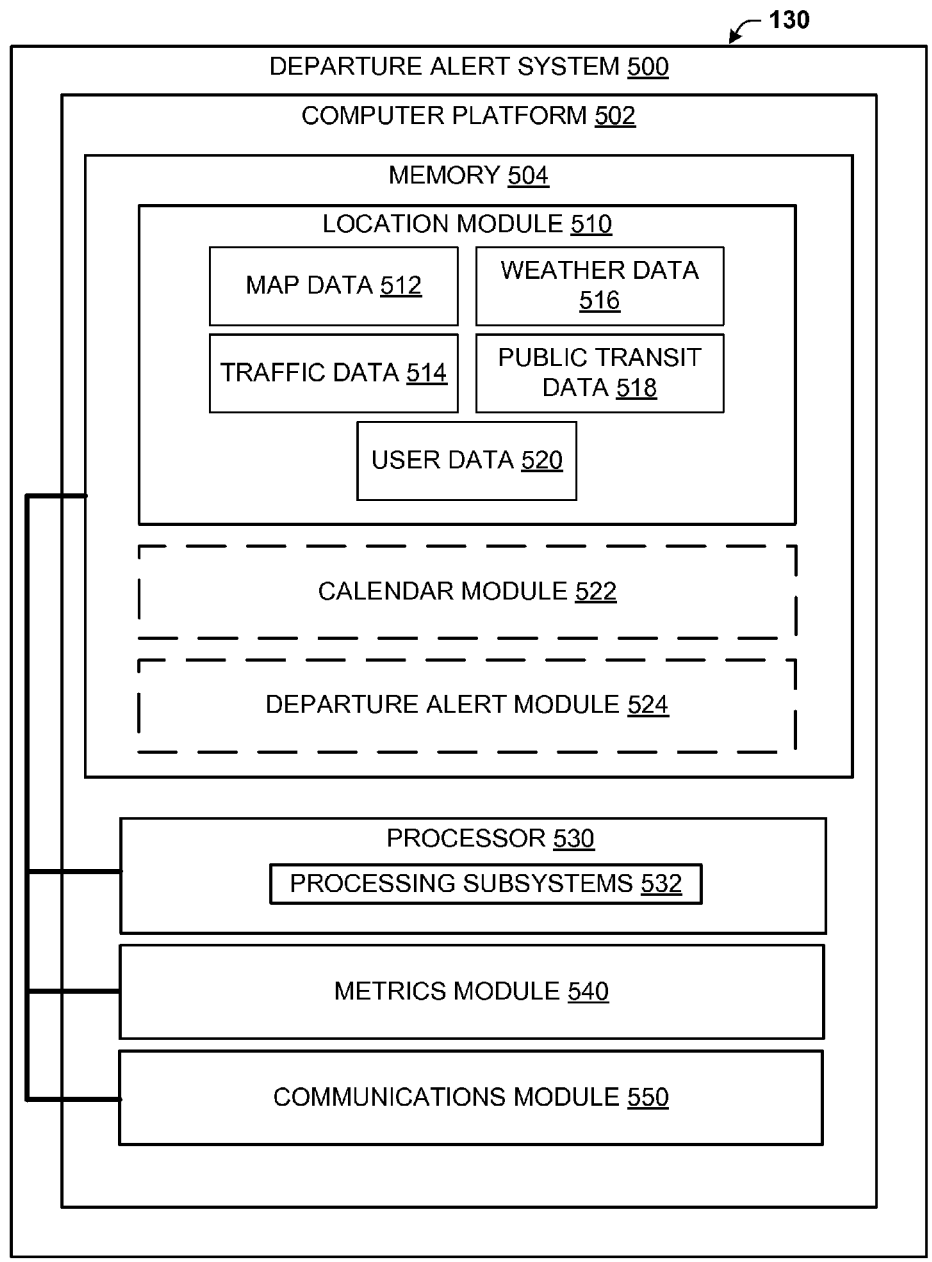
FIG. 5 illustrates exemplary block diagram of an departure alert system according to an aspect.

With reference to FIG. 5, illustrated is a detailed block diagram of departure alert system 500, such as departure alert server 130 depicted in FIG. 1. Departure alert system 500 may comprise at least one of any type of hardware, server, personal computer, mini computer, mainframe computer, or any computing device either special purpose or general computing device. Further, the modules and applications described herein as being operated on or executed by departure alert system 500 may be executed entirely on a single network device, as shown in FIG. 5, or alternatively, in other aspects, separate servers, databases or computer devices may work in concert to provide data in usable formats to parties, and/or to provide a separate layer of control in the data flow between communications device 110 and the modules and applications executed by departure alert system 500.

Departure alert system 500 includes computer platform 502 that can transmit and receive data across wired and wireless networks, and that can execute routines and applications. Computer platform 502 includes memory 504, which may comprise volatile and nonvolatile memory such as read-only and/or random-access memory (ROM and RAM), EPROM, EEPROM, flash cards, or any memory common to computer platforms. Further, memory 504 may include one or more flash memory cells, or may be any secondary or tertiary storage device, such as magnetic media, optical media, tape, or soft or hard disk. Further, computer platform 502 also includes processor 530, which may be an application-specific integrated circuit ("ASIC"), or other chipset, logic circuit, or other data processing device. Processor 530 may include various processing subsystems 532 embodied in hardware, firmware, software, and combinations thereof, that enable the functionality of media content distribution system 14 and the operability of the network device on a wired or wireless network.

Computer platform 502 further includes communications module 550 embodied in hardware, firmware, software, and combinations thereof, that enables communications among the various components of departure alert system 500, as well as between departure alert system 500, device 110, and computing device 150. Communication module 550 may include the requisite hardware, firmware, software and/or combinations thereof for establishing a wireless communication connection. According to described aspects, communication module 550 may include the necessary hardware, firmware and/or software to facilitate wireless broadcast, multicast and/or unicast communication of requested content items, content guides, etc.

Computer platform 502 further includes metrics module 540 embodied in hardware, firmware, software, and combinations thereof, that enables metrics received from device 110 corresponding to, among other things, data communicated from device 110 and/or computing device 150. In one aspect, departure alert system 500 may analyze data received through metrics module 540 to modify data prepared for future distribution to device 110. For example, if the metrics module 540 returns data indicating the user was unable to make an event within a calculated estimated time, then the departure alert system 500 may modify subsequent calculations for travel time estimates for the specific user, may suggest alternative routes, may modify a default buffer value, etc.

Memory 504 of service provider system 500 includes location module 510 operable for aid a departure alert process. In one aspect, location module 510 may include information modules, such as but not limited to, map data 512, traffic data 414, weather data 516, public transit data 518, user data 520, etc. Location module 510 may provide at least a portion of information obtained through the above referenced information modules to a departure alert module, such as departure alert module 524 which may be associated the departure alert system 500. Further, in an aspect in which departure alert module 524 is associated the departure alert system 500, calendar module 522 may also be associated with departure alert system 500. As such, departure alert module 524 may access information from the above described information modules, and calendar module to generate departure alerts. The departure alerts may be generated using a process as described above with reference to FIG. 2. Further, generated departure alerts may be transmitted to WCD 110, computing device 150, etc.

In operation, departure alert system 500 may obtain through calendar module 522 scheduling data associated with at least one event, wherein the data may include applicable event start times, possible participants, locations, etc. Further, departure alert system 500 may obtain at least a location value for the device and a current time. In one aspect, from the obtained information, departure alert module 524 may determine if scheduled events are to be held at different locations from each other and/or from the device location. In such an aspect, after departure alert module 524 may determine applicable event and/or device locations sufficiently differ, departure alert module 524 may estimate travel time between the events and/or between the event and device. Continuing the above aspect, departure alert module 524 may generate a departure time value by comparing an event time value and an applicable estimated travel time value. Further, departure alert module 524 may generate a departure alert by comparing the departure time value and the current time value. Still further, departure alert module may transmit such generated departure time values and/or departure alert values to the WCD 110.

Figure 6:
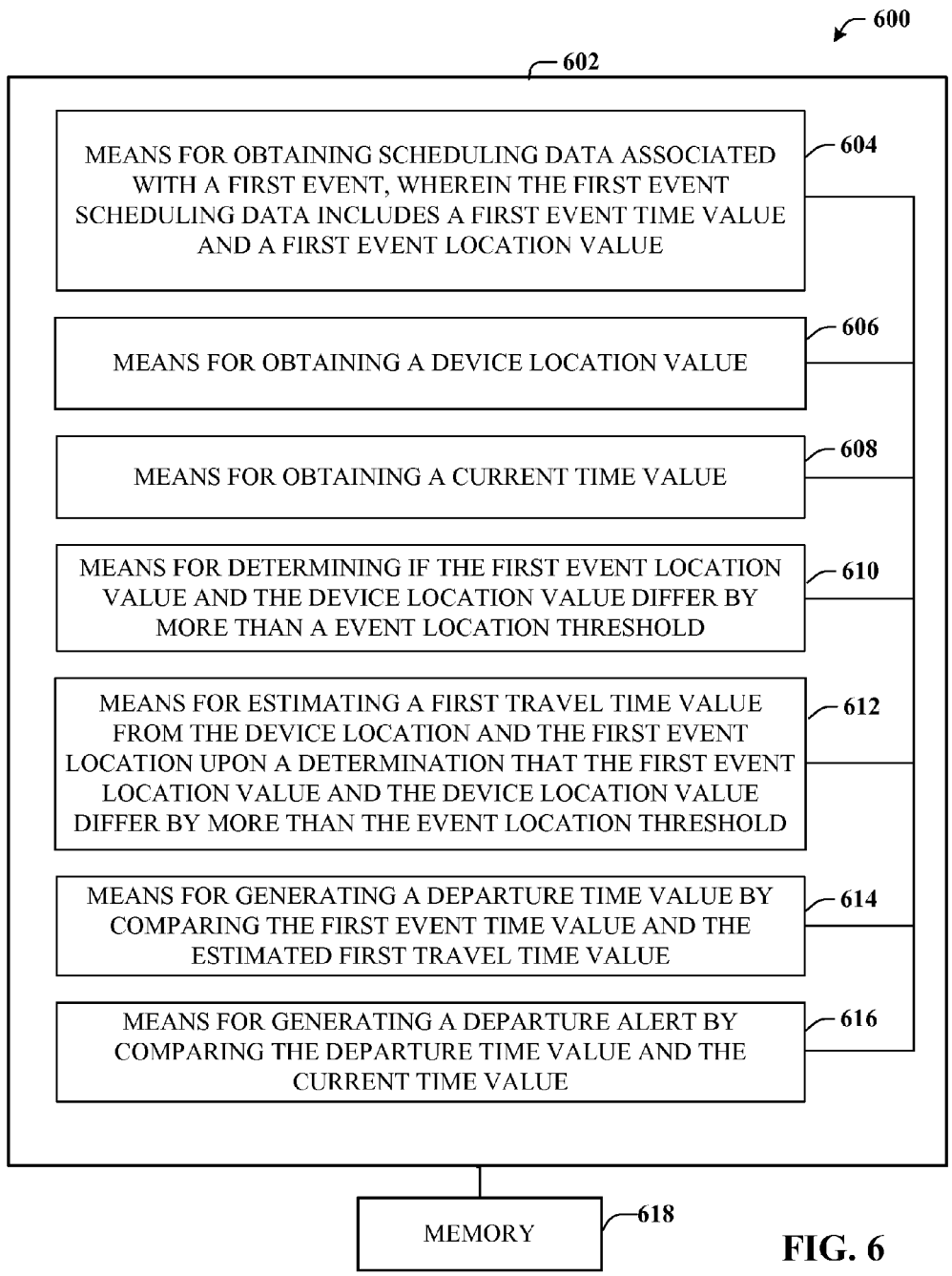
FIG. 6 illustrates a block diagram of an exemplary communications device that can generate at least one departure alert for at least one event based on a location of a device.

With reference to FIG. 6, a block diagram of an exemplary system 600 that can generate at least one departure alert for at least one event is illustrated. For example, system 600 can reside at least partially within a wireless device. According to another example aspect, system 600 can reside at least partially within an access terminal. It is to be appreciated that system 600 is represented as including functional blocks, which can be functional blocks that represent functions implemented by a processor, software, or combination thereof (e.g., firmware). System 600 includes a logical grouping 602 of means that can act in conjunction. For instance, logical grouping 602 can include means for obtaining scheduling data associated with a first event, wherein the first event scheduling data includes a first event time value and a first event location value 604. In one aspect, obtaining scheduling data associated with a first event may include receiving the data associated with the first event from a user input, receiving the data associated with the first event from a network, wherein the receiving from the network is associated with a synchronizing process to uniformly present one or more scheduled events for the user, etc. Further, logical grouping 602 can comprise means for obtaining a device location value 606. In one aspect, obtaining a device location value may include: receiving the device location from a user input, receiving the device location through a location detecting sensor associated with the device, receiving the device location from a network provided value, etc. Further, logical grouping 602 can comprise means for obtaining a current time value 608. Further, logical grouping 602 can comprise means for determining if the first event location value and the device location value differ by more than an event location threshold 610. For example, the event location threshold may include at least one of: a predefined distance, wherein the predefined distance may be defined by at least one of; a user, a default device setting, etc., or a trigger event, wherein the trigger event may include at least one of: a determination that device is located in a foreign locality, or a determination that the device operated in airplane mode within a predefined duration of time, a user selection, etc. Further, logical grouping 602 can comprise means for estimating a first travel time value from the device location and the first event location upon a determination that the first event location value and the device location value differ by more than the event location threshold 612. In one aspect, the estimating the travel time may include: determining at least one route between the device location and the first event location. In another aspect, the estimating the travel time may further include at least one of: obtaining traffic conditions for said at least one route and modifying the estimated travel time based on an estimated time influence associated with the obtained traffic conditions, obtaining mode of transportation information to be used for said at least one route and modifying the estimated travel time based on an estimated time influence associated with the obtained mode of transportation information, obtaining a user selection of one route from the at least one routes and estimating the travel time value for the selected route. Further, logical grouping 602 can comprise means for generating a departure time value by comparing the first event time value and the estimated first travel time value 614. In one aspect, the determining a departure time may further include modifying the estimated travel time value by a predefined buffer time prior to comparing the first event time value and the estimated first travel time value. Further, logical grouping 602 can comprise means for generating a departure alert by comparing the departure time value and the current time value 616. In one aspect, the generated departure alert value may be transmitted to other devices associated with the WCD. Additionally, system 600 can include a memory 618 that retains instructions for executing functions associated with the means 604, 606, 608, 610, 612, 614 and 616. While shown as being external to memory 618, it is to be understood that one or more of the means 604, 606, 608, 610, 612, 614 and 616 can exist within memory 618.

Figure 7:
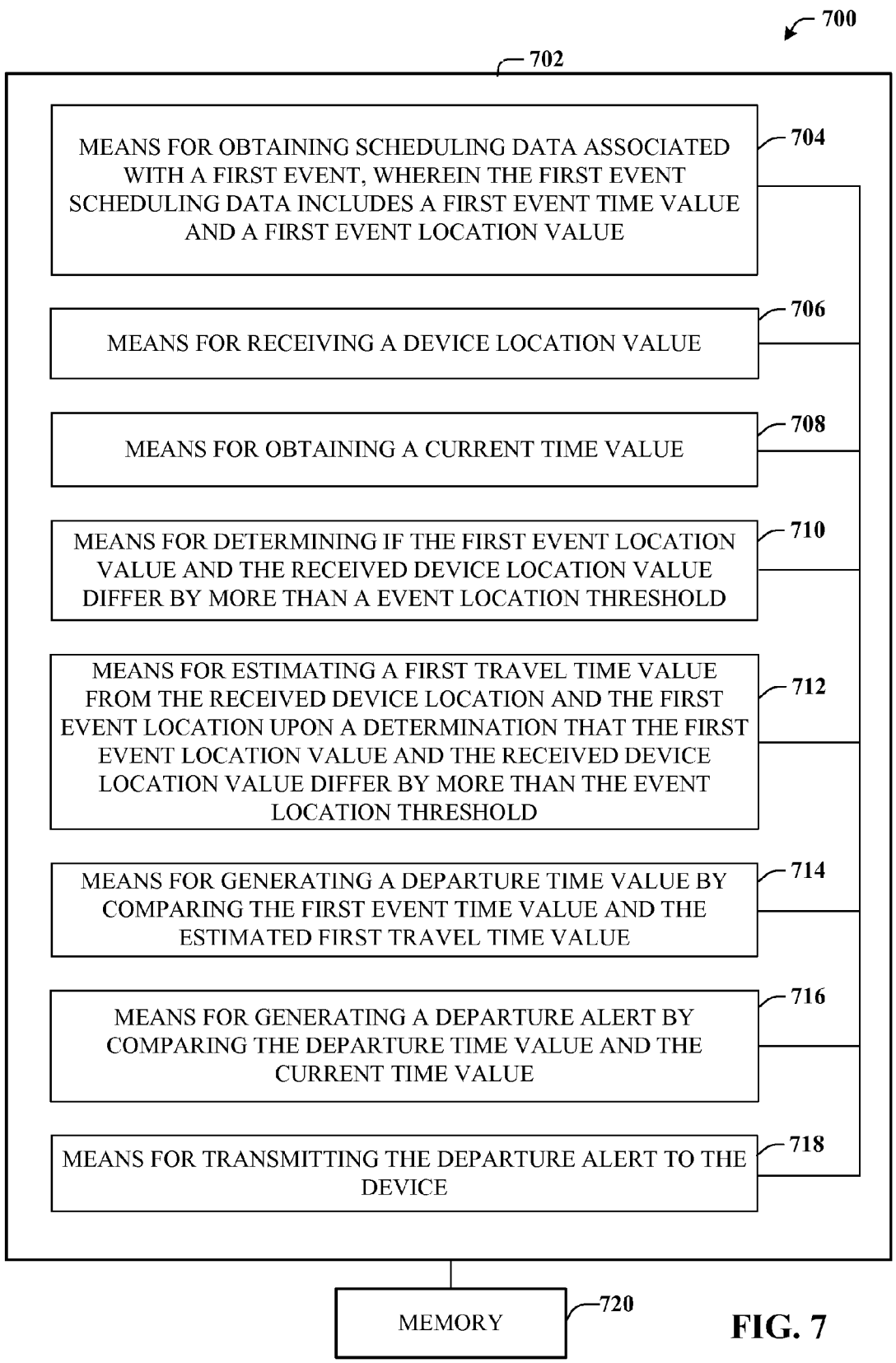
FIG. 7 illustrates a block diagram of an exemplary network device that can generate at least one departure alert for a device for at least one event.

With reference to FIG. 7, a block diagram of an exemplary system 700 that can generating at least one departure alert for a device for at least one event is illustrated. For example, system 700 can reside at least partially within a wireless device. According to another example aspect, system 700 can reside at least partially within an access terminal. It is to be appreciated that system 700 is represented as including functional blocks, which can be functional blocks that represent functions implemented by a processor, software, or combination thereof (e.g., firmware). System 700 includes a logical grouping 702 of means that can act in conjunction. For instance, logical grouping 702 can include means for obtaining scheduling data associated with a first event, wherein the first event scheduling data includes a first event time value and a first event location value 704. In one aspect, obtaining scheduling data associated with a first event may include receiving the data associated with the first event from a user input, receiving the data associated with the first event from a WCD, etc. In such an aspect, receiving from the WCD may be associated with a synchronizing process to uniformly present one or more scheduled events for the user, etc across multiple computing platforms. Further, logical grouping 702 can comprise means for receiving a device location value 706. In one aspect, obtaining a device location value may include: receiving the device location from a user input, receiving the device location through a location detecting sensor associated with the device, receiving the device location from a network provided value, etc.. Further, logical grouping 702 can comprise means for obtaining a current time value 708. Further, logical grouping 702 can comprise means for determining if the first event location value and the received device location value differ by more than an event location threshold 710. For example, For example, the event location threshold may include at least one of: a predefined distance, wherein the predefined distance may be defined by at least one of; a user, a default device setting, etc., or a trigger event, wherein the trigger event may include at least one of: a determination that device is located in a foreign locality, or a determination that the device operated in airplane mode within a predefined duration of time, a user selection, etc. Further, logical grouping 702 can comprise means for estimating a first travel time value from the received device location and the first event location upon a determination that the first event location value and the received device location value differ by more than the event location threshold 712. In one aspect, the estimating the travel time may include: determining at least one route between the device location and the first event location. In another aspect, the estimating the travel time may further include at least one of: obtaining traffic conditions for said at least one route and modifying the estimated travel time based on an estimated time influence associated with the obtained traffic conditions, obtaining mode of transportation information to be used for said at least one route and modifying the estimated travel time based on an estimated time influence associated with the obtained mode of transportation information, obtaining a user selection of one route from the at least one routes and estimating the travel time value for the selected route. Further, logical grouping 702 can comprise means for generating a departure time value by comparing the first event time value and the estimated first travel time value 714. In one aspect, the determining a departure time may further include modifying the estimated travel time value by a predefined buffer time prior to comparing the first event time value and the estimated first travel time value. Further, logical grouping 702 can comprise means for generating a departure alert by comparing the departure time value and the current time value 716. Further, logical grouping 702 can comprise means for transmitting the departure alert to the device 718. In one aspect, the departure alert may be transmitted after generation, may be transmitted in response to the current time being within a predefined time of the departure alert, upon a user request, etc. Additionally, system 700 can include a memory 720 that retains instructions for executing functions associated with the means 704, 706, 708, 710, 712, 714, 716 and 718. While shown as being external to memory 720, it is to be understood that one or more of the means 704, 706, 708, 710, 712, 714, 716 and 718 can exist within memory 720.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method operable with a device for generating at least one departure alert for at least one event, the method comprising:
    obtaining scheduling data associated with a first event, wherein the first event scheduling data includes a first event time value and a first event location value;
    obtaining a device location value;
    obtaining a current time value;
    determining if the first event location value and the device location value differ by more than an event location threshold, wherein the event location threshold includes at least one of a predefined distance or a trigger event;
    upon a determination that the first event location value and the device location value differ by more than the event location threshold, estimating a first travel time value from the device location and the first event location;
    generating, by the device, a departure time value by comparing the first event time value and the estimated first travel time value; and
    generating, by the device, a departure alert by comparing the departure time value and the current time value.

2. The method of claim 1, further comprising:
    determining if the departure time value temporally exceeds the current time value;
    upon a determination that the departure time value temporally exceeds the current time value, generating a tardiness alert associated with the first event.

3. The method of claim 2, wherein the scheduling data associated with the first event further comprises contact information for one or more participants to the first event; and
    further comprising, transmitting the tardiness alert to at least one of the one or more participants to the first event.

4. The method of claim 3, wherein the transmitting further comprises:
    prompting a user that the tardiness alert has been generated; and
    receiving an input selecting which of the one or more participants will receive the tardiness alert.

5. The method of claim 1, further comprising:
    obtaining scheduling data associated with a second event, wherein the second event scheduling data includes a second event time value and a second event location value;
    determining if a scheduling conflict exists between the second event and the first event; and
    upon a determination that there is a scheduling conflict between the second event conflicts and the first event, generating a scheduling conflict alert.

6. The method of claim 5, wherein the determining if a scheduling conflict exists further comprises:
    generating a first event scheduling buffer time value from the first event time value and the estimated first travel time;
    determining if the second event time value conflicts with the first event scheduling buffer time value.

7. The method of claim 5, wherein the determining if a scheduling conflict exists further comprises:
    determining if the second event time value occurs temporally after the first event time value;
    upon a determination that the second event time value occurs temporally after the first event time value, determining if the second event location value and the first event location value differ by more than a second event location threshold;
    upon a determination that the second event location value and the first event location value differ by more than the second event location threshold, estimating a second travel time value from the first event location and the second event location;
    generating a second departure time value by comparing at least one of the second event time value and the estimated second travel time value; and
    generating a second departure alert by comparing the second departure time value and the current time value.

8. The method of claim 5, wherein the determining if a scheduling conflict exists further comprises:
   determining if the second event time value is temporally before the first event time value;
   upon a determination that the second event time value is temporally before the first event time value, determining if at least one of the second event location value and the first event location value differ by more than a second event location threshold, or if the second event location value and the device location value differ by more than the event location threshold;
   upon a determination that at least one of the second event location value and the first event location value differ by more than the second event location threshold or the second event location value and the device location value differ by more than the event location threshold, estimating at least one of a second travel time value from the device location and the second event location or a third travel time value from the second event location and the first event location;
   generating at least one departure time value by comparing at least one of the second event time value and the estimated second travel time value or the second event time value and the estimated third time value; and
   generating one or more departure alerts by comparing at least one of the generated departure time values and the current time value.

9. The method of claim 1, wherein the obtaining scheduling data associated with the first event further comprises at least one of:
   receiving the data associated with the first event from a user input, or
   receiving the data associated with the first event from a network, wherein the receiving from the network is associated with a synchronizing process to uniformly present one or more scheduled events for the user.

10. The method of claim 1, wherein the first event time value further comprises at least one of a first event start time, and a first event end time.

11. The method of claim 1, wherein the obtaining the device location, further comprises at least one of:
   receiving the device location from a user input, or
   receiving the device location through a location detecting sensor associated with the device, or
   receiving the device location from a network provided value.

12. The method of claim 1,
   wherein the predefined distance is defined by at least one of; a user, or a default device setting; and
   wherein the trigger event includes at least one of: a determination that device is located in a foreign locality, or a determination that the device operated in airplane mode within a predefined duration of time.

13. The method of claim 1, wherein the estimating the travel time further comprises:
   determining at least one route between the device location and the first event location;
   obtaining at least one of:
   traffic conditions for said at least one route and modifying the estimated travel time based on an estimated time influence associated with the obtained traffic conditions, or
   mode of transportation information to be used for said at least one route and modifying the estimated travel time based on an estimated time influence associated with the obtained mode of transportation information, or
   a user selection of one route from the at least one routes and estimating the travel time value for the selected route; and
   displaying the selected route on the device.

14. The method of claim 13, wherein the mode of transportation information includes determining whether movement of the device is to be associated with at least one of: walking, or moving in a personal transportation vehicle, or moving in a public transportation vehicle.

15. The method of claim 1, wherein the determining a departure time further comprises modifying the estimated travel time value by a predefined buffer time prior to comparing the first event time value and the estimated first travel time value.

16. At least one processor operable with a device and configured to generate at least one departure alert for at least one event:
   a first module for obtaining scheduling data associated with a first event, wherein the first event scheduling data includes a first event time value and a first event location value;
   a second module for obtaining a device location value;
   a third module for obtaining a current time value;
   a fourth module for determining if the first event location value and the device location value differ by more than an event location threshold, wherein the event location threshold includes at least one of a predefined distance or a trigger event;
   a fifth module for estimating a first travel time value from the device location and the first event location upon a determination that the first event location value and the device location value differ by more than the event location threshold;
   a sixth module for generating, at the device, a departure time value by comparing the first event time value and the estimated first travel time value; and
   a seventh module for generating. at the device, a departure alert by comparing the departure time value and the current time value.

17. A computer program product operable with a device and configured to generate at least one departure alert for at least one event, comprising:
   a non-transitory computer-readable medium comprising:
   a first set of codes for causing a computer to obtain scheduling data associated with a first event, wherein the first event scheduling data includes a first event time value and a first event location value;
   a second set of codes for causing the computer to obtain a device location value;
   a third set of codes for causing the computer to obtain a current time value;
   a fourth set of codes for causing the computer to determine if the first event location value and the device location value differ by more than an event location threshold, wherein the event location threshold includes at least one of a predefined distance or a trigger event;
   a fifth set of codes for causing the computer to estimate a first travel time value from the device location and the first event location upon a determination that the first event location value and the device location value differ by more than the event location threshold;
   a sixth set of codes for causing the computer to generate, at the device, a departure time value by comparing the first event time value and the estimated first travel time value; and a seventh set of codes for causing the computer to generate, at the device, a departure alert by comparing the departure time value and the current time value.

18. An apparatus operable with a device and configured to generate at least one departure alert for at least one event, comprising:
means for obtaining scheduling data associated with a first event, wherein the first event scheduling data includes a first event time value and a first event location value;
means for obtaining a device location value;
means for obtaining a current time value;
means for determining if the first event location value and the device location value differ by more than an event location threshold, wherein the event location threshold includes at least one of a predefined distance or a trigger event;
means for estimating a first travel time value from the device location and the first event location upon a determination that the first event location value and the device location value differ by more than the event location threshold;
means for generating, at the device, a departure time value by comparing the first event time value and the estimated first travel time value; and
means for generating, at the device, a departure alert by comparing the departure time value and the current time value.

19. An apparatus operable with a device and configured to generate at least one departure alert for at least one event, comprising:
a communications module for:
obtaining scheduling data associated with a first event, wherein the first event scheduling data includes a first event time value and a first event location value;
obtaining a device location value;
obtaining a current time value; and
a departure alert module for:
determining if the first event location value and the device location value differ by more than an event location threshold, wherein the event location threshold includes at least one of a predefined distance or a trigger event;
upon a determination that the first event location value and the device location value differ by more than the event location threshold, estimating a first travel time value from the device location and the first event location;
generating, at the device, a departure time value by comparing the first event time value and the estimated first travel time value; and
generating, at the device, a departure alert by comparing the departure time value and the current time value.

20. The apparatus of claim 19, wherein the departure alert module is further operable for:
determining if the departure time value temporally exceeds the current time value;
upon a determination that the departure time value temporally exceeds the current time value, generating a tardiness alert associated with the first event.

21. The apparatus of claim 20, wherein the scheduling data associated with the first event further comprises contact information for one or more participants to the first event; and
wherein the departure alert module is further operable for transmitting the tardiness alert to at least one of the one or more participants to the first event.

22. The apparatus of claim 21, wherein the communications module is further operable for:
prompting a user that the tardiness alert has been generated; and
receiving an input selecting which of the one or more participants will receive the tardiness alert.

23. The apparatus of claim 19, wherein the communications module is further operable for:
obtaining scheduling data associated with a second event, wherein the second event scheduling data includes a second event time value and a second event location value; and
wherein the departure alert module is further operable for:
determining if a scheduling conflict exists between the second event and the first event; and
upon a determination that there is a scheduling conflict between the second event conflicts and the first event, generating a scheduling conflict alert.

24. The apparatus of claim 23, wherein the departure alert module is further operable for:
generating a first event scheduling buffer time value from the first event time value and the estimated first travel time;
determining if the second event time value conflicts with the first event scheduling buffer time value.

25. The apparatus of claim 23, wherein the departure alert module is further operable for:
determining if the second event time value occurs temporally after the first event time value;
upon a determination that the second event time value occurs temporally after the first event time value, determining if the second event location value and the first event location value differ by more than a second event location threshold;
upon a determination that the second event location value and the first event location value differ by more than the second event location threshold, estimating a second travel time value from the first event location and the second event location;
generating a second departure time value by comparing at least one of the second event time value and the estimated second travel time value; and
generating a second departure alert by comparing the second departure time value and the current time value.

26. The apparatus of claim 23, wherein the departure alert module is further operable for:
determining if the second event time value is temporally before the first event time value;
upon a determination that the second event time value is temporally before the first event time value, determining if at least one of the second event location value and the first event location value differ by more than a second event location threshold or if the second event location value and the device location value differ by more than the event location threshold;
upon a determination that at least one of the second event location value and the first event location value differ by more than the second event location threshold or the second event location value and the device location value differ by more than the event location threshold, estimating at least one of a second travel time value from the device location and the second event location or a third travel time value from the second event location and the first event location;
generating at least one departure time value by comparing at least one of the second event time value and the estimated second travel time value or the second event time value and the estimated third time value; and generating one or more departure alerts by comparing at least one of the generated departure time values and the current time value.

27. The apparatus of claim 19, wherein the communications module is further operable for:
receiving the data associated with the first event from a user input, or
receiving the data associated with the first event from a network, wherein the receiving from the network is associated with a synchronizing process to uniformly present one or more scheduled events for the user.

28. The apparatus of claim 19, wherein the first event time value further comprises at least one of a first event start time, and a first event end time.

29. The apparatus of claim 19, wherein the communications module is further operable for:
receiving the device location from a user input, or receiving the device location through a location detecting sensor associated with the device, or
receiving the device location from a network provided value.

30. The apparatus of claim 19,
wherein the predefined distance is defined by at least one of; a user, or a default device setting; and
wherein the trigger event includes at least one of: a determination that device is located in a foreign locality, or a determination that the device operated in airplane mode within a predefined duration of time.

31. The apparatus of claim 19, wherein the departure alert module is further operable for:
determining at least one route between the device location and the first event location;
obtaining at least one of:
traffic conditions for said at least one route and modifying the estimated travel time based on an estimated time influence associated with the obtained traffic conditions, or
mode of transportation information to be used for said at least one route and modifying the estimated travel time based on an estimated time influence associated with the obtained mode of transportation information, or
a user selection of one route from the at least one routes and estimating the travel time value for the selected route; and
wherein the communication module is further operable for displaying the selected route on the device.

32. The apparatus of claim 31, wherein the mode of transportation information includes determining whether movement of the device is to be associated with at least one of: walking, or moving in a personal transportation vehicle, or moving in a public transportation vehicle.

33. The apparatus of claim 19, wherein the departure alert module is further operable for modifying the estimated travel time value by a predefined buffer time prior to comparing the first event time value and the estimated first travel time value.

34. A method of generating at least one departure alert for a device for at least one event, the method comprising:
obtaining scheduling data associated with a first event, wherein the first event scheduling data includes a first event time value and a first event location value;
receiving a device location value;
obtaining a current time value;
determining if the first event location value and the received device location value differ by more than an event location threshold, wherein the event location threshold includes at least one of a predefined distance or a trigger event;
upon a determination that the first event location value and the received device location value differ by more than the event location threshold, estimating a first travel time value from the received device location and the first event location;
generating a departure time value by comparing the first event time value and the estimated first travel time value;
generating a departure alert by comparing the departure time value and the current time value; and
transmitting the departure alert to the device.

35. The method of claim 34, further comprising:
determining if the departure time value temporally exceeds the current time value;
upon a determination that the departure time value temporally exceeds the current time value, generating a tardiness alert associated with the first event; and
transmitting the tardiness alert to the device.

36. The method of claim 35, wherein the scheduling data associated with the first event further comprises contact information for one or more participants to the first event; and
further comprising, transmitting the tardiness alert to at least one of the one or more participants to the first event.

37. The method of claim 36, wherein the transmitting the tardiness alert to at least one of the one or more participants further comprises:
receiving a user selection selecting to which of the one or more participants will receive the tardiness alert;
transmitting the tardiness alert to the selected one or more participants.

38. The method of claim 34, further comprising:
obtaining scheduling data associated with a second event, wherein the second event scheduling data includes a second event time value and a second event location value;
determining if a scheduling conflict exists between the second event and the first event;
upon a determination that there is a scheduling conflict between the second event conflicts and the first event, generating a scheduling conflict alert; and
transmitting the scheduling conflict alert to the device.

39. The method of claim 38, wherein the determining if a scheduling conflict exists further comprises:
generating a first event scheduling buffer time value from the first event time value and the estimated first travel time; and
determining if the second event time value conflicts with the first event scheduling buffer time value.

40. The method of claim 38, wherein the determining if a scheduling conflict exists further comprises:
determining if the second event time value occurs temporally after the first event time value;
upon a determination that the second event time value occurs temporally after the first event time value, determining if the second event location value and the first event location value differ by more than a second event location threshold;
upon a determination that the second event location value and the first event location value differ by more than the second event location threshold, estimating a second travel time value from the first event location and the second event location;
generating a second departure time value by comparing at least one of the second event time value and the estimated second travel time value;
generating a second departure alert by comparing the second departure time value and the current time value; and
transmitting the second departure alert to the device.

41. The method of claim 38, wherein the determining if a scheduling conflict exists further comprises:
  determining if the second event time value is temporally before the first event time value;
  upon a determination that the second event time value is temporally before the first event time value, determining if at least one of the second event location value and the first event location value differ by more than a second event location threshold or if the second event location value and the device location value differ by more than the event location threshold;
  upon a determination that at least one of the second event location value and the first event location value differ by more than the second event location threshold or the second event location value and the device location value differ by more than the event location threshold, estimating at least one of a second travel time value from the device location and the second event location or a third travel time value from the second event location and the first event location;
  generating at least one departure time value by comparing at least one of the second event time value and the estimated second travel time value or the second event time value and the estimated third time value;
  generating one or more departure alerts by comparing at least one of the generated departure time values and the current time value; and
  transmitting the one or more departure alerts to the device.

42. The method of claim 34, wherein the first event time value further comprises at least one of a first event start time, and a first event end time.

43. The method of claim 34,
  wherein the predefined distance is defined by at least one of: a user, or a default device setting; and
  wherein the trigger event includes at least one of: a determination that device is located in a foreign locality, or a determination that the device previously operated in airplane mode within a predefined duration of time, or a user selection.

44. The method of claim 34, wherein the estimating the travel time further comprises:
  determining at least one route between the device location and the first event location;
  obtaining at least one of:
  traffic conditions for said at least one route and modifying the estimated travel time based on an estimated time influence associated with the obtained traffic conditions, or
  mode of transportation information to be used for said at least one route and modifying the estimated travel time based on an estimated time influence associated with the obtained mode of transportation information, or
  a user selection of one route from the at least one routes and estimating the travel time value for the selected route; and
  displaying the selected route on the device.

45. The method of claim 44, wherein the mode of transportation information includes determining whether movement of the device is to be associated with at least one of: walking, or moving in a personal transportation vehicle, or moving in a public transportation vehicle.

46. The method of claim 34, wherein the determining a departure time further comprises modifying the estimated travel time value by a predefined buffer time prior to comparing the first event time value and the estimated first travel time value.

47. At least one processor configured to generate at least one departure alert for a device for at least one event:
  a first module for obtaining scheduling data associated with a first event, wherein the first event scheduling data includes a first event time value and a first event location value;
  a second module for receiving a device location value;
  a third module for obtaining a current time value;
  a fourth module for determining if the first event location value and the received device location value differ by more than an event location threshold, wherein the event location threshold includes at least one of a predefined distance or a trigger event;
  a fifth module for upon a determination that the first event location value and the received device location value differ by more than the event location threshold, estimating a first travel time value from the received device location and the first event location;
  a sixth module for generating a departure time value by comparing the first event time value and the estimated first travel time value;
  a seventh module for generating a departure alert by comparing the departure time value and the current time value; and
  an eighth module for transmitting the departure alert to the device.

48. A computer program product, comprising:
  a non-transitory computer-readable medium comprising:
  a first set of codes for causing a computer to obtain scheduling data associated with a first event, wherein the first event scheduling data includes a first event time value and a first event location value;
  a second set of codes for causing the computer to receive a device location value;
  a third set of codes for causing the computer to obtain a current time value;
  a fourth set of codes for causing the computer to determine if the first event location value and the received device location value differ by more than an event location threshold, wherein the event location threshold includes at least one of a predefined distance or a trigger event;
  a fifth set of codes for causing the computer to estimate a first travel time value from the received device location and the first event location upon a determination that the first event location value and the received device location value differ by more than the event location threshold;
  a sixth set of codes for causing the computer to generate a departure time value by comparing the first event time value and the estimated first travel time value;
  a seventh set of codes for causing the computer to generate a departure alert by comparing the departure time value and the current time value; and
  a eighth set of codes for causing the computer to transmit the departure alert to the device.

49. An apparatus, comprising:
  means for obtaining scheduling data associated with a first event, wherein the first event scheduling data includes a first event time value and a first event location value;
  means for receiving a device location value;
  means for obtaining a current time value;
  means for determining if the first event location value and the received device location value differ by more than an event location threshold, wherein the event location threshold includes at least one of a predefined distance or a trigger event;

means for estimating a first travel time value from the received device location and the first event location upon a determination that the first event location value and the received device location value differ by more than the event location threshold;

means for generating a departure time value by comparing the first event time value and the estimated first travel time value;

means for generating a departure alert by comparing the departure time value and the current time value; and means for transmitting the departure alert to the device.

50. An apparatus, comprising:
   a communications module for:
      obtaining scheduling data associated with a first event, wherein the first event scheduling data includes a first event time value and a first event location value;
      receiving a device location value;
      obtaining a current time value;
   a departure alert module for:
      determining if the first event location value and the received device location value differ by more than an event location threshold, wherein the event location threshold includes at least one of a predefined distance or a trigger event;
   upon a determination that the first event location value and the received device location value differ by more than the event location threshold, estimating a first travel time value from the received device location and the first event location;
      generating a departure time value by comparing the first event time value and the estimated first travel time value;
      generating a departure alert by comparing the departure time value and the current time value; and
      wherein the communication module is further operable for: transmitting the departure alert to the device.

51. The apparatus of claim 50, wherein the departure alert module is further operable for:
   determining if the departure time value temporally exceeds the current time value;
   upon a determination that the departure time value temporally exceeds the current time value, generating a tardiness alert associated with the first event; and
   wherein the communication module is further operable for: transmitting the tardiness alert to the device.

52. The apparatus of claim 51, wherein the scheduling data associated with the first event further comprises contact information for one or more participants to the first event; and
   wherein the communication module further comprises transmitting the tardiness alert to at least one of the one or more participants to the first event.

53. The apparatus of claim 52, wherein the communication module further comprises:
   receiving a user selection selecting which of the one or more participants will receive the tardiness alert;
   transmitting the tardiness alert to the selected one or more participants.

54. The apparatus of claim 50, wherein the departure alert module is further operable for:
   obtaining scheduling data associated with a second event, wherein the second event scheduling data includes a second event time value and a second event location value;
   determining if a scheduling conflict exists between the second event and the first event;
   upon a determination that there is a scheduling conflict between the second event conflicts and the first event, generating a scheduling conflict alert; and
   wherein the communication module is further operable for transmitting the scheduling conflict alert to the device.

55. The apparatus of claim 54, wherein the departure alert module is further operable for:
   generating a first event scheduling buffer time value from the first event time value and the estimated first travel time; and
   determining if the second event time value conflicts with the first event scheduling buffer time value.

56. The apparatus of claim 54, wherein the departure alert module is further operable for:
   determining if the second event time value occurs temporally after the first event time value;
   upon a determination that the second event time value occurs temporally after the first event time value, determining if the second event location value and the first event location value differ by more than a second event location threshold;
   upon a determination that the second event location value and the first event location value differ by more than the second event location threshold, estimating a second travel time value from the first event location and the second event location;
   generating a second departure time value by comparing at least one of the second event time value and the estimated second travel time value;
   generating a second departure alert by comparing the second departure time value and the current time value; and
   wherein the communication module is further operable for transmitting the second departure alert to the device.

57. The apparatus of claim 54, wherein the departure alert module is further operable for:
   determining if the second event time value is temporally before the first event time value;
   upon a determination that the second event time value is temporally before the first event time value, determining if at least one of the second event location value and the first event location value differ by more than a second event location threshold or if the second event location value and the device location value differ by more than the event location threshold;
   upon a determination that at least one of the second event location value and the first event location value differ by more than the second event location threshold or the second event location value and the device location value differ by more than the event location threshold, estimating at least one of a second travel time value from the device location and the second event location or a third travel time value from the second event location and the first event location;
   generating at least one departure time value by comparing at least one of the second event time value and the estimated second travel time value or the second event time value and the estimated third time value;
   generating one or more departure alerts by comparing at least one of the generated departure time values and the current time value; and
   transmitting the one or more departure alerts to the device.

58. The apparatus of claim 50, wherein the first event time value further comprises at least one of a first event start time, and a first event end time.

59. The apparatus of claim 50,
   wherein the predefined distance is defined by at least one of; a user, or a default device setting; and wherein the trigger event includes at least one of: a determination that device is located in a foreign locality, or a determination that the device previously operated in airplane mode within a predefined duration of time.

60. The apparatus of claim 50, wherein the departure alert module is further operable for:
   determining at least one route between the device location and the first event location;
   obtaining at least one of:
   traffic conditions for said at least one route and modifying the estimated travel time based on an estimated time influence associated with the obtained traffic conditions, or
   mode of transportation information to be used for said at least one route and modifying the estimated travel time based on an estimated time influence associated with the obtained mode of transportation information, or
   a user selection of one route from the at least one routes and estimating the travel time value for the selected route; and
   displaying the selected route on the device.

61. The apparatus of claim 60, wherein the mode of transportation information includes determining whether movement of the device is to be associated with at least one of: walking, or moving in a personal transportation vehicle, or moving in a public transportation vehicle.

62. The apparatus of claim 50, wherein the departure alert module is further operable for:
   modifying the estimated travel time value by a predefined buffer time prior to comparing the first event time value and the estimated first travel time value.

* * * * *